(12) United States Patent
Dörfler et al.

(10) Patent No.: US 11,229,292 B2
(45) Date of Patent: Jan. 25, 2022

(54) AIR CUSHION DEVICE AND SEAT WITH THE AIR CUSHION DEVICE

(71) Applicant: Alfmeier Präzision SE, Treuchtlingen (DE)

(72) Inventors: Erich Dörfler, Landsberg (DE); Ronny Gehlmann, Allersberg (DE)

(73) Assignee: Alfmeier Präzision SE, Treuchtlingen (DE)

( * ) Notice: Subject to any disclaimer, the term of this patent is extended or adjusted under 35 U.S.C. 154(b) by 0 days.

(21) Appl. No.: 16/752,788

(22) Filed: Jan. 27, 2020

(65) Prior Publication Data
US 2020/0253381 A1 Aug. 13, 2020

(30) Foreign Application Priority Data
Feb. 7, 2019 (DE) .................... 10 2019 103 072.2

(51) Int. Cl.
| | |
|---|---|
| *A47C 7/14* | (2006.01) |
| *A47C 7/46* | (2006.01) |
| *A47C 7/18* | (2006.01) |
| *A47C 7/20* | (2006.01) |
| *B60N 2/58* | (2006.01) |
| *B60N 2/90* | (2018.01) |
| *B60N 2/66* | (2006.01) |
| *A47C 7/44* | (2006.01) |

(52) U.S. Cl.
CPC ............... *A47C 7/142* (2018.08); *A47C 7/18* (2013.01); *A47C 7/20* (2013.01); *A47C 7/467* (2013.01); *A47C 7/446* (2013.01); *B60N 2/5825* (2013.01); *B60N 2/665* (2015.04); *B60N 2/914* (2018.02); *B60N 2/976* (2018.02)

(58) Field of Classification Search
None
See application file for complete search history.

(56) References Cited

U.S. PATENT DOCUMENTS

| | | | | |
|---|---|---|---|---|
| 4,619,481 | A * | 10/1986 | Grudzinskas | A47C 7/467 297/284.1 |
| 9,333,889 | B1 | 5/2016 | Cloutier | |
| 2005/0184565 | A1* | 8/2005 | Weiss | B60N 2/5635 297/180.15 |
| 2006/0032265 | A1* | 2/2006 | Shaw | B60N 2/5621 62/420 |
| 2006/0175877 | A1* | 8/2006 | Alionte | B60N 2/5657 297/180.14 |
| 2009/0085384 | A1* | 4/2009 | Galbreath | B60N 2/5825 297/218.1 |

(Continued)

FOREIGN PATENT DOCUMENTS

| | | | | |
|---|---|---|---|---|
| CN | 203460741 U | 3/2014 | | |
| CN | 105584398 A | 5/2016 | | |
| JP | 2014141133 A | * | 8/2014 | ............. B60N 2/914 |

OTHER PUBLICATIONS

Chinese Office Action dated Jul. 6, 2021, with English translation.

*Primary Examiner* — David E Allred
(74) *Attorney, Agent, or Firm* — JK Intellectual Property Law, PA

(57) ABSTRACT

An air cushion device for a seat includes at least one first air cushion and a second air cushion, first and second air inlets, first and second air ducts, and a device preventing the second air duct from being pinched off by a fixing wire of a seat cover.

12 Claims, 5 Drawing Sheets

(56) References Cited

U.S. PATENT DOCUMENTS

| | | | |
|---|---|---|---|
| 2011/0072776 A1* | 3/2011 | De Greve | D02G 3/441 |
| | | | 57/211 |
| 2012/0168420 A1* | 7/2012 | Ogino | B60H 1/00285 |
| | | | 219/217 |
| 2018/0118071 A1* | 5/2018 | Sugiyama | A47C 7/744 |
| 2019/0184882 A1* | 6/2019 | Siegmann | B60N 2/7094 |
| 2020/0247287 A1* | 8/2020 | Iacovone | B60N 2/5642 |
| 2021/0268944 A1* | 9/2021 | Hoshi | B60N 2/56 |
| 2021/0289942 A1* | 9/2021 | Sakai | A47C 7/46 |

\* cited by examiner

B-B

A-A

A-A

A-A

A-A

C-C

AIR CUSHION DEVICE AND SEAT WITH THE AIR CUSHION DEVICE

CROSS-REFERENCE TO RELATED APPLICATIONS

This application claims benefit to German Patent Application Number 10 2019 103 072.2, filed Feb. 7, 2019, which is incorporated in its entirety by reference herein.

TECHNICAL FIELD

The disclosure relates to an air cushion device and to a seat with an air cushion device.

BACKGROUND

In car seats, the seat covers are generally fixed in place with the help of wires. To accomplish this, fixing wires can be incorporated into the cover or fastened to it. These wires are fastened with clamps to additional wires, which are attached to a foam on the seats or to a support device of the seat. Such fixing clamps are known, for example, from DE 199 52 059 A1. The fixing wires create a tack in the seat cover. Such a fastening of a seat cover in connection with an air conditioning of the car seat is disclosed, for example, in DE 10 2006 048 048 B4, in which an air cushion subdivided into various partial areas is arranged on the car seat. The air cushion has air bridges in the area of the tacks.

A cushion for a car seat installation is known from DE 10 2014 006 872 A1. In the cushion, an air-permeable airflow layer is arranged. Airflow elements separated by a tack are provided between various cushion areas.

In seats, especially in car seats, not only basic adjustments like inclining the backrest or seat cushion or adjusting the seat height are desirable. Rather, adjusting the seat contour or cushion hardness is also wanted to adjust the seat to the anatomical conditions of various seat users or increase seat comfort. To do this, it is customary to integrate an adjustable lumbar support into the backrest. So the well-being of a seat user can be increased and prevent the driver from getting stressed and tired, massage systems integrated into the seat can also be used, for example. Furthermore, the side framings of the seat can often be adjusted as well in order to adjust the width of the backrest or seat cushion to the height of the respective seat user, thereby offering a secure lateral support.

Such lumbar support or such massage system or such side framing adjustment is also accomplished by one or several bubbles incorporated into the seat or air cushion that are generally made of an elastic material, which can be filled with air and drained or deflated. The filling or deflating of the air cushion is typically achieved with the help of valves and a pneumatic pump. Their hardness or shape—and therefore the seat contour—are influenced by the quantity of air filling the air cushion. As a result of this, the lumbar support and/or lateral support can be adjusted to the individual seating needs of the respective user and afterwards maintained while the seat is being used, i.e. during a drive. To execute a massage function, the air cushions integrated into the seat are cyclically inflated and deflated, thereby selectively and dynamically changing the seat contour.

In current massage systems or lumbar supports, air chambers are distributed over the entire backrest of the seat or over the entire seat. However, the cushion's tacks are problematic because the air ducts can be squeezed or damaged by the tacks. To date, this has been solved by having separated air supply ducts supply the areas of a massage system or lumbar support system separated by a tack.

SUMMARY

The purpose of the disclosure is to eliminate the disadvantage according to the state of the art. In particular, an air cushion device that is easier to install and cheaper to manufacture should be specified.

The purpose of the disclosure is solved by the features set forth below with regard to the air cushion device and by the features set forth below with regard to the car seat. The appropriate designs result from the corresponding dependent claims.

The air cushion device for a seat according to the disclosure, especially for a car seat, with an elastic support device with a seat cover provided with fixing wires, includes at least a first air cushion and a second air cushion. Such fixing wires like those arranged in the support device can be formed as a wire, especially a metal wire, but also as plastic elements that are largely rod-shaped.

The first air cushion is dimensioned so it can be arranged in a first area of the seat and the second air cushion is dimensioned so it can be arranged in a second area of the seat separated from the first one by the fixing wire. The first and second area can be arranged, for example, in the back and shoulder area of a backrest. The fixing wire can be horizontally arranged, for example.

The first air cushion has a first air inlet and the second air cushion has a second air inlet. Moreover, the air cushion device includes at least a first air duct and a second air duct. The first and second air inlet can in each case be designed as air inlet and air outlet. However, separate air outlets can be provided in each air cushion.

The first air duct is connected to the first air inlet and the second air duct is connected to the second air inlet in each case on a first side. The first air duct and the second air duct are in each case connected to an air supply intake. The air supply intake can be especially the outlet of a pump, so that the air from the pump is routed through the individual air cushions through the air ducts. Thus, in particular, the first and second air ducts are routed in parallel all the way to the first air cushion and afterwards only the second air duct is continued to the second air cushion.

On or in the second air duct, a device is present to prevent the second air duct from being clamped by a fixing wire of the seat cover.

This device can be designed in various ways, as explained in the following designs.

In a first design, the device includes a clip, which has in particular a first and second fixing section and optionally a third fixing section, whereby the first fixing section is laid out for fixing a fixing wire in place, whereby the second fixing section is laid out for fixing the second air duct in place, and the third fixing section is laid out for fixing the clip in the elastic support device or on a foil carrier. Such a clip can be made of metal or plastic. The clip can be firmly attached to the second air duct and/or the fixing wire, especially through gluing, clamping or welding.

Expediently, the second fixing section is arranged in the middle area of the clip and the first fixing section on the clip side pointing away from the third fixing section.

In the design, the second fixing section includes a protrusion designed in C-shape as a seat for the second air duct.

Alternatively or additionally, the first fixing section includes a protrusion designed in C-shape as a seat for a fixing wire.

Furthermore expediently, the C-shaped protrusion of the second fixing section and the C-shaped protrusion of the first fixing section is arranged at an angle to one other, especially perpendicularly. With a clip of such a design, the fixing wire and air duct can be arranged perpendicularly to one another.

In a design of the disclosure, the second air duct includes a first hose and a foil duct connected to the second air cushion, whereby the device includes a structuring present in the foil duct that especially forms one single piece with the foil duct. The foil duct can be directly connected to the second air cushion, particularly executed as one single piece with the second air cushion. Alternately, the foil duct can be connected to a second hose section of the second air duct arranged between the second air cushion and foil duct.

Expediently, the structuring includes embossed connecting ducts, which run especially linearly and/or parallel to one another. The structuring is accomplished, for example, by the deep drawing or pressing of one side or both sides of the foil duct.

In a further design of the disclosure, the elastic support device is provided with one or several wires for fixing the fixing wire or wires in place that have the device, whereby the device includes an arching or tapering of the material of one wire or several ones. In this case, the wire or wires have a bead, bending, flattening or tapering of the material, in each case designed in such a way that a pressing of the second air duct is prevented by the corresponding wire.

In the design, the device includes an arching or tapering of the material of one or several of the fixing wires. In this case, the fixing wire or fixing wires have a bead, bending, flattening or tapering of the material, in each case designed in such a way that a pressing of the second air duct is prevented by the corresponding wire. Expediently, however, a side of the fixing wire facing the user is designed in a smooth and even way so the user will not notice any change of shape of the wire developed as device.

In a further design, the air cushion device includes an even number of first air cushions and an even number of second air cushions, whereby the first air cushions and the second air cushions are arranged in a first row and a second row, especially mirror-symmetrically, whereby each row includes a first air duct for each first air cushion and a second air duct for each second air cushion.

Expediently, the air cushion device includes exactly two second air cushions and two or four or six or eight first air cushions.

In the design, a part of the first air cushions and/or second air cushions, especially all first air cushions or all first air cushions and second air cushions, are arranged on a one-piece foil carrier. To achieve this, the first and second air cushions (which are arranged in a row) can be arranged for example on a joint, especially one-piece, foil carrier. In particular, the associated first and second air ducts are also arranged on the foil carrier and can be welded to the foil carrier, for example. Such a design facilitates the assembly of the air cushion device. Alternately, only all the first air cushions can be arranged on a one-piece foil carrier and the second air cushions are optionally arranged on another foil carrier. In this case, the second air ducts can be guided without foil carrier and connected to the fixing wire with a clip. In this design, the clip can have especially only one first and second fixing section.

The air cushion device according to the disclosure is especially developed as a massage device and/or lumbar support device.

The seat, especially car seat, according to the disclosure includes an elastic support device and a seat cover provided with fixing wires, with an air cushion device according to one of the preceding claims.

Here, the air cushion device is expediently integrated into a backrest and/or a seat surface of the seat.

In the design, the elastic support device is a foam. The support device can have depressions for the easier fixing of the wires in the support device with the fixing wire or wires. Preferably, the elastic support device has a foam with additional depressions, especially ducts, whereby the first and second air ducts run in the ducts.

BRIEF DESCRIPTION OF THE DRAWINGS

The disclosure will now be explained in more detail below, also with regard to further features and advantages by describing the embodiments and with reference to the enclosed drawings, which individually show in a schematic diagram.

DETAILED DESCRIPTION

Figure 1A:
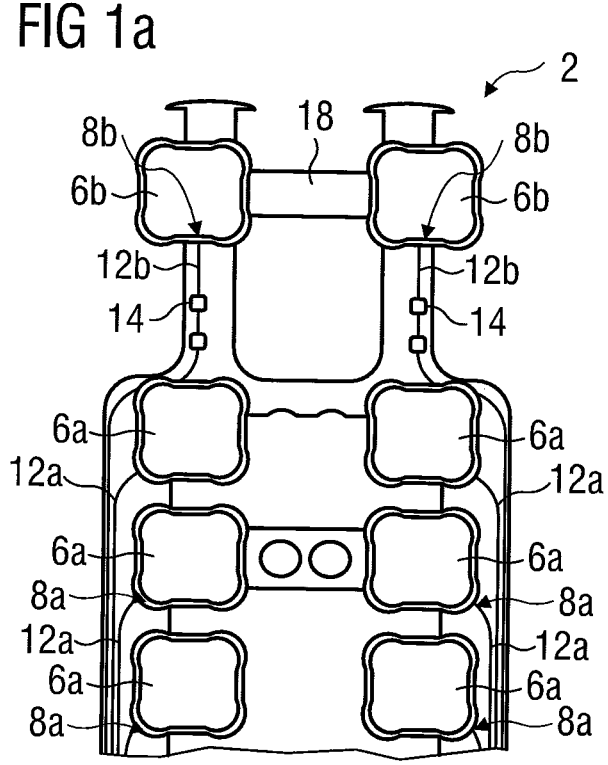
FIG. 1a is a schematic front view of a first design of the air cushion device.

FIG. 1a shows a first design of the air cushion device 2. In the present case, the air cushion device 2 has six first air cushions 6a and two second air cushions 6b. The air cushions 6a, 6b are symmetrically arranged relative to a vertical axis. A first air duct 12a connected to a first air inlet 8a is guided towards each one of the first air cushions 6a. The second air cushions 6b, in each case provided with a second air inlet 8b, are connected in each case to a second air duct 12b. On each second air duct 12b, at least one device 14 is provided in each case. The devices 14 are arranged on both second air ducts 12b, in each case on the same height. The individual first and second air cushions 6a, 6b are attached here to a foil carrier 18. Furthermore, the first and second air ducts 12a and 12b can also be fixed in place to the foil carrier 18. The air cushion device 2 can be easily mounted as one single piece on a support device 22 (not shown) of a seat 4, which includes a foam, for example, by means of the foil carrier 18.

Figure 1B:
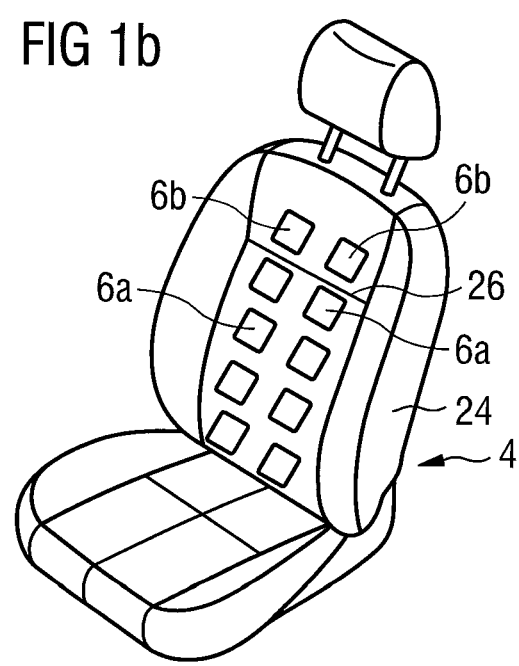
FIG. 1b is an isometric view of a first design of a seat.

As shown in FIG. 1b, the air cushion device 2 of the first design can be arranged in a car seat. The seat 4 has a seat surface and a backrest. The backrest has a tack in which a fixing wire 26 is inserted. With this fixing wire 26, the backrest is subdivided into a first area—here the lower area—and a second area—here the shoulder area. In the lower area, eight first air cushions 6a have been arranged here in two rows; in the shoulder area, two second air cushions 6b. In the tack area, the devices 14 are arranged in such a way that the second air ducts 12b are not squeezed by the fixing wire 26, and they cannot be especially squeezed in such a way that no air is supplied any longer to the second air cushions 6b.

Figure 2:
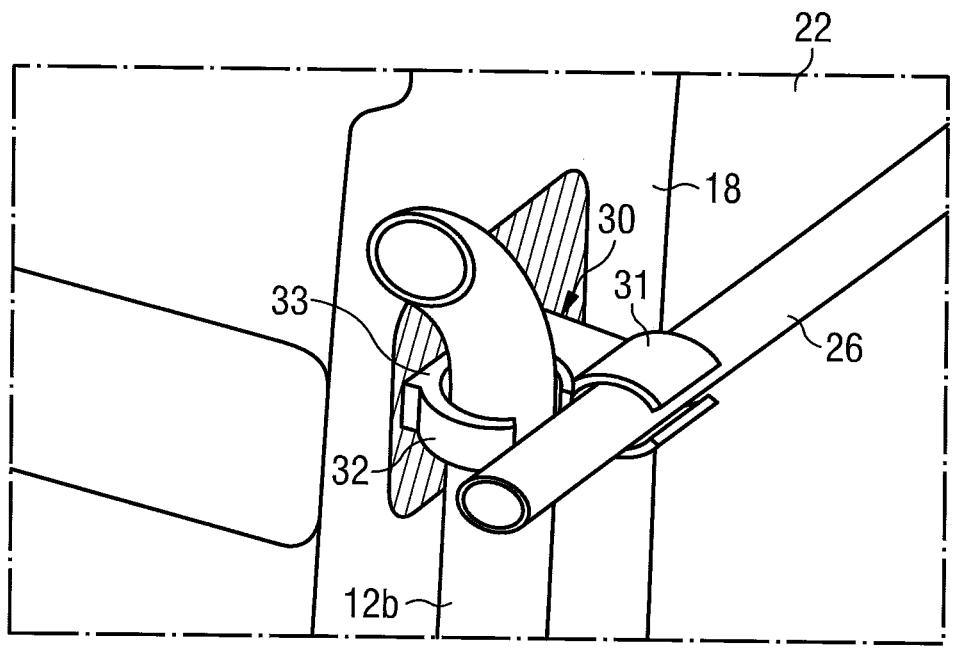
FIG. 2 is an isometric detailed view of a clip.

FIG. 2 shows a clip 30 as device 14. It has a third fixing section 33 extending towards the support device 22. Furthermore, the clip 30 has a second fixing section 32. Here, the second fixing section 32 is arranged in the middle of the clip 30 and has a C-shaped protrusion. The C-shaped protrusion is designed as a seat for the second air duct 12b. The clip 30 also has a first fixing section 31. The first fixing section 31 is arranged on a side facing away from the third fixing section 33. The first fixing section 31 has likewise a C-shaped protrusion. The C-shaped protrusion of the first fixing section 31 has been arranged so it can serve as seat for the fixing wire 26. The arrangement selected in this way securely prevents contact between the fixing wire 26 and the second air duct 12b, thereby securely and effectively preventing the second air duct 12b from being squeezed and damaged.

Figure 3:
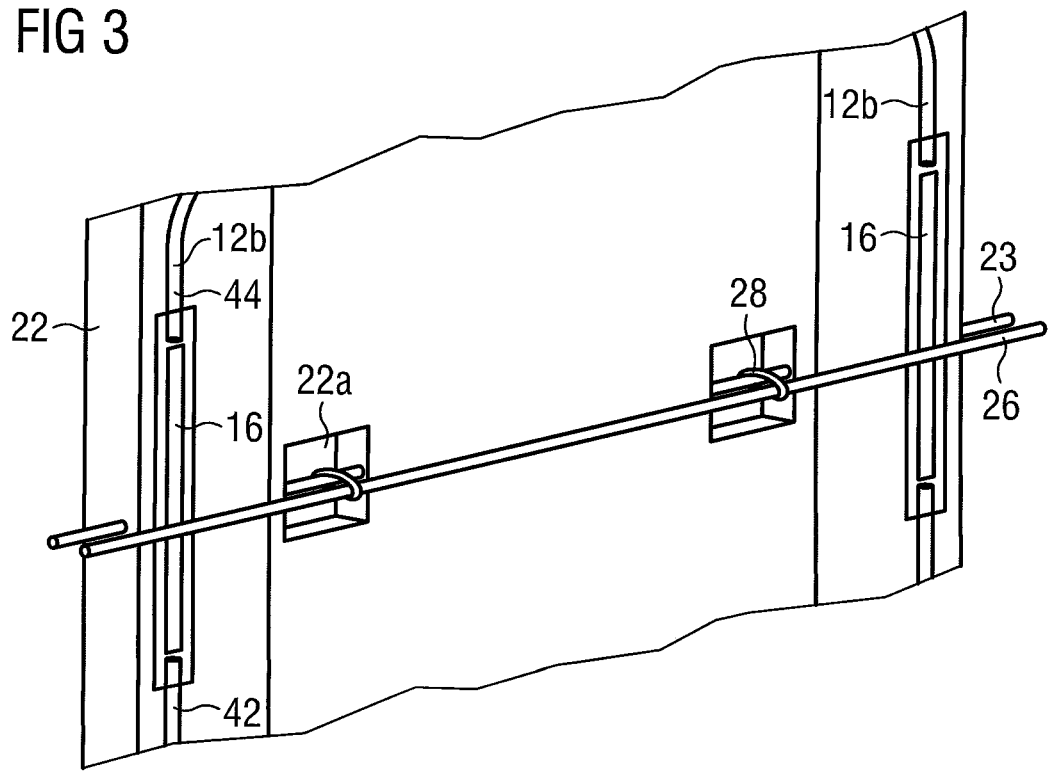
FIG. 3 is an isometric partial view of a second design of the air cushion device.
Figure 4:
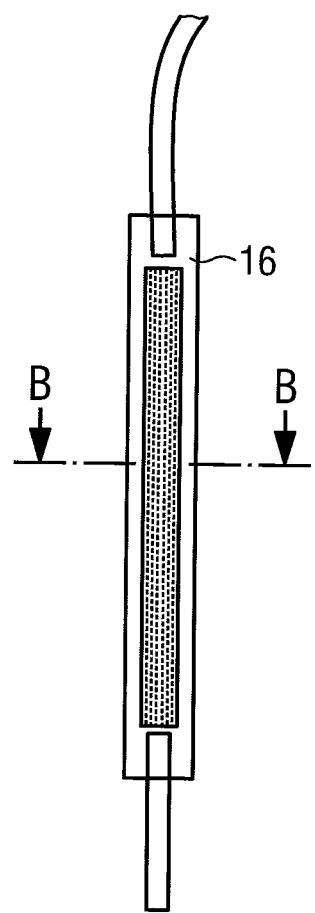
FIG. 4 is a detailed view of the second design.

FIG. 3 shows a second design of the air cushion device 2. The air cushion device 2 is arranged on a support device 22 of a seat 4. In the support device 22, a wire 23 has been horizontally arranged. The wire 23 extends especially through a foam of the support device 22. A fixing wire 26 is arranged parallel to the wire 23. This fixing wire 26 is connected in a permanent or detachable way to a seat cover, particularly a seat cover made of fabric. In the support device 22, depressions 22a have been arranged, in which the wire 23 protrudes from the support device 22. In the area of the depression 22a, the wire 23 is attached to the fixing wire 26 by means of a clamp 28, for example, and a tack has been developed. To one side of the depressions 22a, the second air ducts 12b run perpendicularly to the wire 23 and the fixing wire 26. The air ducts 12b are in each case provided with a foil duct 16. The foil duct 16 is a device 14 that prevents the second air duct 12b to be pinched off from a fixing wire 26 of the seat cover. Such a foil duct 16 in an air duct 12b is also shown in FIG. 4. The cross-hatched area is the area through which the air is guided. The foil duct 16 overlaps a hose of the air duct 12b; in particular, the foil duct 16 is inserted through a hose end of a first hose section 42 and a second hose section 44 of the air duct 12b and thus sealed.

Figure 5:
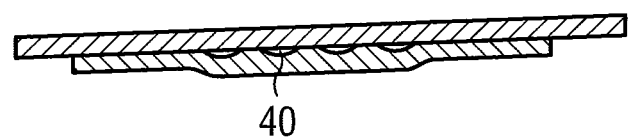
FIG. 5 is a cross-sectional view along lines B-B through the foil duct of FIG. 4.

FIG. 5 shows a cross section of the foil duct 16 along line B-B of FIG. 4. The foil duct 16 has several connecting ducts 40, here four connecting ducts 40. The connecting ducts 40 can be inserted, for example, by deep drawing, pressing or embossing in one side or both sides of the foil duct 16. The foil duct 16 is designed in a way to prevent the air duct 12b from being pinched off, even when being under compressed stress by the wire 23 and the fixing wire 26.

Figure 6:
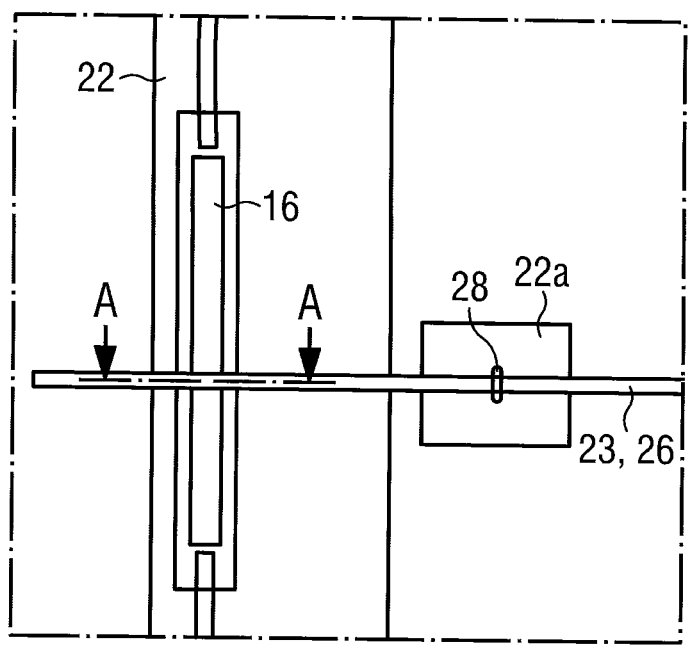
FIG. 6 is a front partial view of a third design of the air cushion device.

FIG. 6 shows a support device 22 with a depression 22a, in which the fixing wire 26 is attached to the wire 23 by means of a clamp 28. The fixing wire 26 crosses the foil duct 16 in this embodiment too.

FIGS. 7a-d show various variants for a cross section along an A-A position.

Figure 7A:
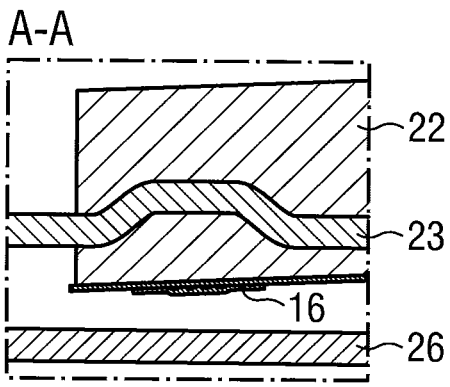
FIG. 7a is a cross-sectional view along lines A-A through the third design according to FIG. 6.

FIG. 7a shows a first variant. In this variant, a foil duct 16 is arranged on the support device 22, which includes a foam. The wire 23 extends through the support device 22. In the area of the foil duct 16, this wire 23 is bent away from the foil duct 16 as beading, so that the wire 23 and the fixing wire 26 do not make contact in the area of the foil duct 16 even under stress. Thus, in the variant shown, the device 14 is formed by the foil duct 16 and the bent wire 23.

Figure 7B:
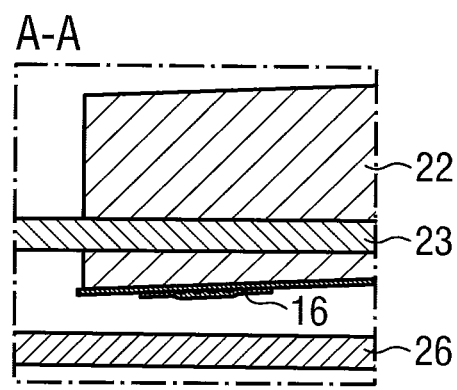
FIG. 7b is a cross-sectional view similar to FIG. 7a but through a fourth design.

FIG. 7b shows a second variant, in which the wire 23 is executed straight, contrary to the variant shown in FIG. 7a. Hence, the device 14 is formed by the foil duct 16.

Figure 7C:
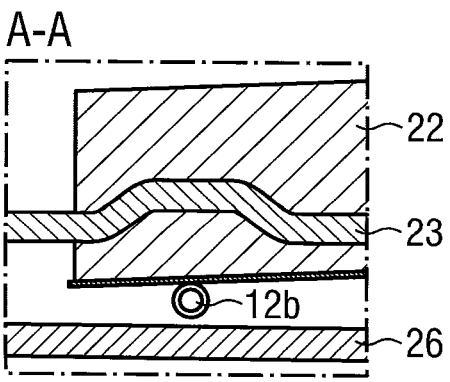
FIG. 7c is a cross-sectional view similar to FIG. 7a but through a fifth design.

FIG. 7c shows a third variant, in which the wire 23 is bent exactly as in FIG. 7a, but the second air duct 12b has a circular cross section and is executed as a hose. Thus, in this variant, the device 14 is merely formed by the wire 23.

Figure 7D:
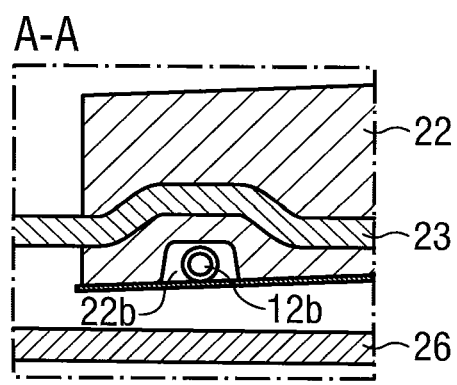
FIG. 7d is a cross-sectional view similar to FIG. 7a but through a sixth design.

FIG. 7d shows a fourth variant, in which—deviating from the variant shown in FIG. 7c—the hose is not inserted outside the support device 22 but in another depression, a duct 22b of the support device 22.

Figure 8:
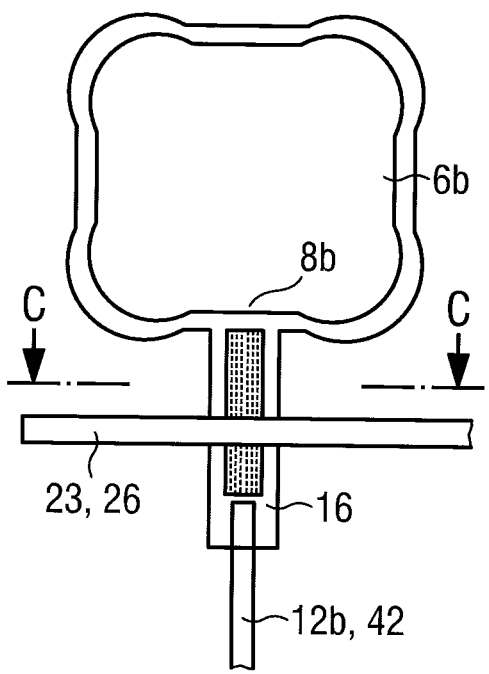
FIG. 8 is a front partial view of a seventh design of the air cushion device.
Figure 9:
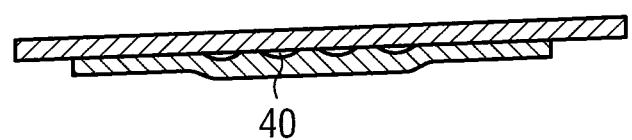
FIG. 9 is a cross-sectional view along lines C-C through the seventh design according to FIG. 8.

FIG. 8 shows another design of the air cushion device with a foil duct 16. In this design, a first hose section 42 of the second air duct 12b is connected to the foil duct 16, which has several connecting ducts 40. The foil duct is guided between the wire 23 and the fixing wire 26 and serves as device 14. In this design, the foil duct 16 is designed as one single piece with the second air cushion 6b. A cross section through the foil duct along C-C is shown in FIG. 9.

| List of reference characters | |
|---|---|
| 2 | Air cushion device |
| 4 | Seat |
| 6 | Air cushion |
| 6a | First air cushion |
| 6b | Second air cushion |
| 8a | First air inlet |
| 8b | Second air inlet |
| 12a | First air duct |
| 12b | Second air duct |
| 14 | Device |
| 16 | Foil duct |
| 18 | Foil carrier |
| 20 | Felt |
| 22 | Support device |
| 22a | Depression |
| 22b | Duct |
| 23 | Wire |
| 24 | Seat cover |
| 26 | Fixing wire |
| 28 | Clamp |
| 30 | Clip |
| 31 | First fixing section |
| 32 | Second fixing section |
| 33 | Third fixing section |
| 40 | Connecting duct |
| 42 | First hose section |
| 44 | Second hose section |

The invention claimed is:

1. An air cushion device for a seat, comprising:
    an elastic support device with a seat cover provided with fixing wires, including at least one first air cushion and a second air cushion;
    wherein the first air cushion is designed so it can be arranged in a first area of the seat;
    wherein the second air cushion is designed so it can be arranged in a second area of the seat separated from the first area by one of the fixing wires;
    wherein the first air cushion has a first air inlet and the second air cushion has a second air inlet;
    wherein the air cushion device furthermore includes at least one first air duct and a second air duct;
    wherein the first air duct is connected to the first air inlet and the second air duct to the second air inlet, wherein the first air duct and the second air duct are connected in each case to an air supply intake; and wherein on or in the second air duct there is a device, which prevents the second air duct from being pinched off by the one of the fixing wires of the seat cover, wherein the second air duct includes a first hose section connected to or including the device, wherein the device comprises a multi-channel duct connected to the second air cushion, and wherein the multi-channel duct comprises one single piece that forms multiple channels that run linearly parallel to each other.

2. An air cushion device according to claim 1, wherein the multi-channel duct is arranged between a first hose section and a second hose section of the second air duct or wherein the multi-channel duct is arranged between a first hose section and the second air cushion, wherein the multi-channel duct is one single piece with the second air cushion.

3. An air cushion device according to claim 1, wherein the multi-channel duct comprises stamped connecting ducts.

4. An air cushion device according to claim 1, wherein the elastic support device is provided with one or several wires for fastening the fixing wire or wires of the device, wherein the device includes an arching or tapering of the material of one or several of the wires.

5. An air cushion device according to claim 1, wherein the device includes an arching or tapering of the material of one or several of the fixing wires.

6. An air cushion device according to claim 1, wherein the air cushion device includes an even number of first air cushions and an even number of second air cushions, wherein the first air cushions and the second air cushions are arranged in a first row and in a second row, mirror-symmetrically, wherein each row includes one first air duct for each first air cushion and a second air duct for each second air cushion.

7. An air cushion device according to claim 6, including exactly two second air cushions and two or four or six or eight first air cushions.

8. An air cushion device according to claim 1, wherein at least a part of the first air cushions and/or of the second air cushions, in particular only all first air cushions or all first air cushions and second air cushions, are arranged on a one-piece elastic support device configured to carry the multi-channel duct.

9. An air cushion device according to claim 1, wherein the air cushion device is a massage device and/or a lumbar support device.

10. A seat, including an elastic support device and a seat cover provided with fixing wires, with an air cushion device according to claim 1.

11. A seat according to claim 10, wherein the air cushion device is integrated into a backrest and/or a seat surface of the seat.

12. A seat according to claim 10, wherein the elastic support device is a foam, preferably the elastic support device is a foam provided with ducts, wherein the first and second air ducts run in the ducts.

* * * * *